United States Patent [19]

Maleki

[11] Patent Number: 5,267,072
[45] Date of Patent: Nov. 30, 1993

[54] DUAL FREQUENCY OPTICAL CARRIER TECHNIQUE FOR TRANSMISSION OF REFERENCE FREQUENCIES IN DISPERSIVE MEDIA

[75] Inventor: Lutfollah Maleki, San Marino, Calif.

[73] Assignee: The United States of America as represented by the Administrator of the National Aeronautics and Space Administration, Washington, D.C.

[21] Appl. No.: 902

[22] Filed: Jan. 7, 1993

Related U.S. Application Data

[63] Continuation of Ser. No. 703,238, May 20, 1991, abandoned.

[51] Int. Cl.5 ............... H04B 10/00; H04B 10/12; H04B 10/04
[52] U.S. Cl. ................... 359/158; 359/154; 359/173; 359/183; 359/189
[58] Field of Search ............. 359/158, 154, 161, 173, 359/183, 189, 190, 191, 195, 187; 455/67.6, 70, 71; 333/18; 307/510, 511

[56] References Cited

U.S. PATENT DOCUMENTS

| | | | |
|---|---|---|---|
| 3,600,587 | 8/1971 | Smith | 359/192 |
| 3,654,473 | 5/1972 | Nussmeier | 359/192 |
| 3,824,340 | 7/1974 | Sensney | 375/118 |
| 4,287,606 | 9/1981 | Lutes, Jr. et al. | 359/161 |
| 4,317,220 | 2/1982 | Martin | 455/71 |
| 4,965,858 | 10/1990 | Naito et al. | 359/192 |
| 5,012,493 | 5/1991 | Hirai et al. | 375/118 |
| 5,056,120 | 10/1991 | Taniguchi et al. | 375/118 |
| 5,107,358 | 5/1992 | Hodgkinson et al. | 359/124 |

FOREIGN PATENT DOCUMENTS 0091750 3/1984 Japan .................. 455/67.6

*Primary Examiner*—Richard E. Chilcot, Jr.
*Assistant Examiner*—Rafael Bacares
*Attorney, Agent, or Firm*—John H. Kusmiss; Thomas H. Jones; Guy M. Miller

[57] ABSTRACT

Two different carrier frequencies modulated by a reference frequency are transmitted to each receiver to be synchronized therewith. Each receiver responds to local phase differences between the two received signals to correct the phase of one of them so as to maintain the corrected signal as a reliable synchronization reference.

32 Claims, 2 Drawing Sheets

DUAL FREQUENCY OPTICAL CARRIER TECHNIQUE FOR TRANSMISSION OF REFERENCE FREQUENCIES IN DISPERSIVE MEDIA

ORIGIN OF THE INVENTION

The invention described herein was made in the performance of work under a NASA contract, and is subject to the provisions of Public Law 96-517 (35 USC 202) in which the Contractor has elected to retain title.

This application is a continuation, of application Ser. No. 07/703,238, filed May 20, 1991 now abandoned.

BACKGROUND OF THE INVENTION

1. Technical Field

The invention relates to stabilized frequency distribution links, suitable for guided wave and free space applications, and immune to degradations resulting from the variations of the dispersive properties of the propagation medium.

2. Background Art

The distribution of stable reference frequencies from a standard to remote locations enables multiple user service from a single source. This function provides considerable economy in the costs of multiple frequency standards, and their operation in stable thermal and magnetic environments. It also enables, for example, experiments requiring phase coherence between two or more stations within a complex, or experiments requiring transfer of stable references to spacecraft.

In most applications the highest attainable stability is required from the standard. It is therefore crucial that any degradations of the reference originating from the distribution link be kept at a minimum. This requirement has necessitated the use of transmission media with inherently high stabilities, and schemes that electronically stabilize residual instabilities. A notable example of stable systems is the optical fiber based frequency distribution link which has achieved the highest stability for reference frequency distribution.

Schemes for the electronic stabilization of the distribution systems are generally based on a comparison of the phase of the input signal at the location of the standard and the phase of the signal at the remote end. This is usually accomplished by returning part of the signal at the remote end to the input point for comparison, thus requiring a two-way transmission of the reference frequencies. Present electronic stabilization schemes are generally based on phase comparisons at transmission and receiving ends thus requiring two-way transmission.

DISCLOSURE OF THE INVENTION

The invention takes advantage of the fact that dispersive effects of a medium on an optical frequency cause a delay which is related to and characteristic of the particular frequency. By modulating two frequencies by the same reference signal, a delay difference may be obtained at the receiver end so as to allow correction for delay and delay changes. One-way stabilization may thus be obtained for reference frequency transmission links. The technique may be applied to free space transmission as well as to guided wave transmission.

The invention thus relies on the use of a dual frequency optical carrier to transmit reference signals generated by a frequency standard to remote users. Signals transmitted on the dual frequency carrier can be compared at the remote end to compensate for instabilities arising from the variations of the dispersive properties of the transmission medium. Some of the major advantages of the proposed scheme are:

Provides for a one-way stabilization of a link, thus enabling longer and cost efficient links; in contrast, previous schemes require a two-way transmission.

Enables stabilized links in free space (in addition to optical fiber) as the medium of propagation. This enables stabilized frequency distribution links to satellites, and the ease of distributing references without installing fiber optic cables in the field.

Enables, with suitable modifications, calibration of delay and dispersion variations in the troposphere and ionosphere. This capability is of crucial importance to radio sciences, specially at Ka band where delay due to the dry component of the troposphere dominates.

Aside from the obvious efficiencies, one-way links enable longer distribution systems since they eliminate the need to return a usable part of the power back to the input point. Furthermore, since the proposed technique is based on eliminating the variations of the dispersion in the transmission medium, it offers the capability for stabilized free space links. Such links are naturally preferred since they eliminate the need for fibers or waveguides and can, in principle at least, be easily established by simply placing the receiver at the remote location. The transmission of reference signals with dual laser frequency carrier in accordance with the invention enables the calibration of variations of the dry component of the troposphere and the ionosphere. Such a calibration technique, once developed, is critical to the success of radio science and orbiting experiments, particularly in the Ka band and higher frequencies, where the delays due to the dry component of the troposphere dominate.

BRIEF DESCRIPTION OF THE DRAWINGS

Preferred embodiments of the invention are described below with reference to the accompanying drawings of which.

MODES FOR CARRYING OUT THE INVENTION

Figure 1:
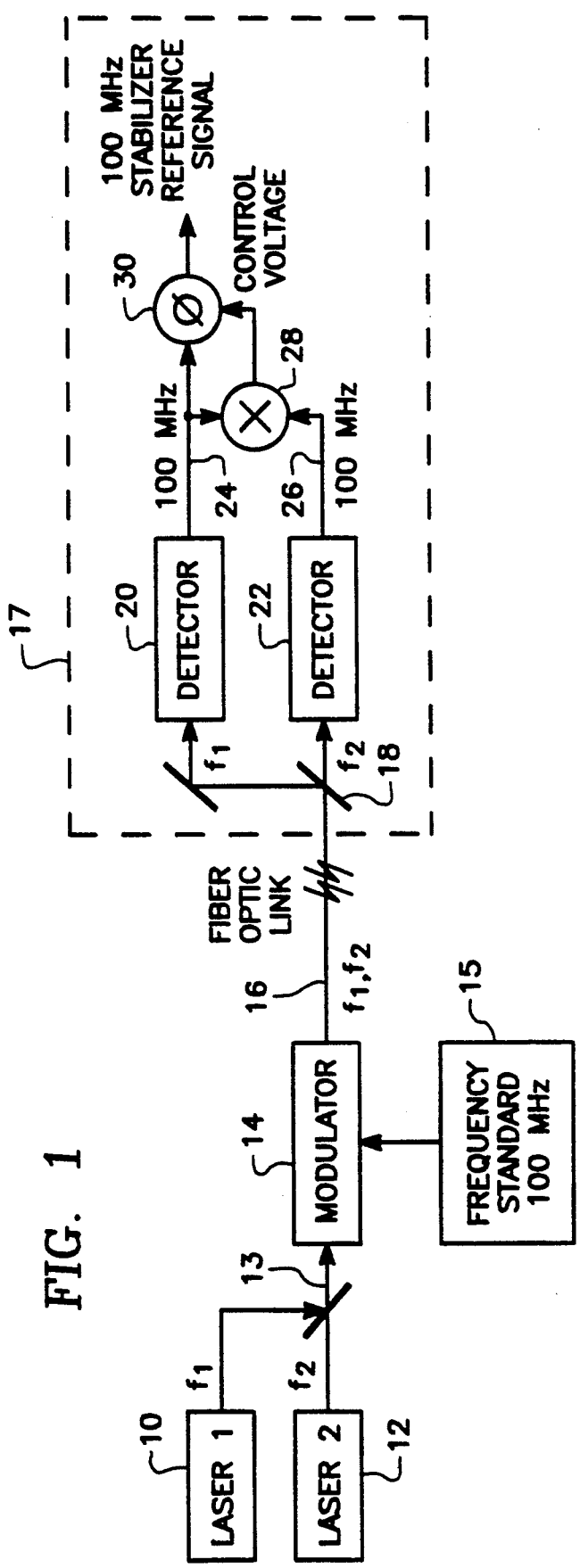
FIG. 1 is a block diagram illustrating an embodiment of the invention employing two lasers.

Referring to FIG. 1, two commercial laser transmitters 10, 12 at 850 and 1300 nm are controlled by external modulation to generate a dual carrier 13. Although diode lasers with dual wavelengths may be commercially obtained, this approach will enable the use of readily available components at a low cost. After the dual carrier is modulated by a modulator 14 with a 100 MHz signal from a frequency standard 15, it is focused on an optical fiber 16.

At the output end of the fiber 16, the light is separated into the two wavelength components by a dichroic beam splitter 18. Each wavelength component $f_1$, $f_2$ is introduced to a respective detector/demodulator 20, 22 which then produces 100 MHz references 24, 26. The two references 24, 26 are compared in a mixer 28, the output of which produces the required control voltage to compensate for the differences of the two 100 MHz references. This control voltage is applied to the control input of a phase controller 30 of the type well-known in the art. The phase controller 30 responds by correcting the phase of the reference signal 24. The output of the phase controller 30 is thus a one-way stabilized reference signal.

Figure 2:
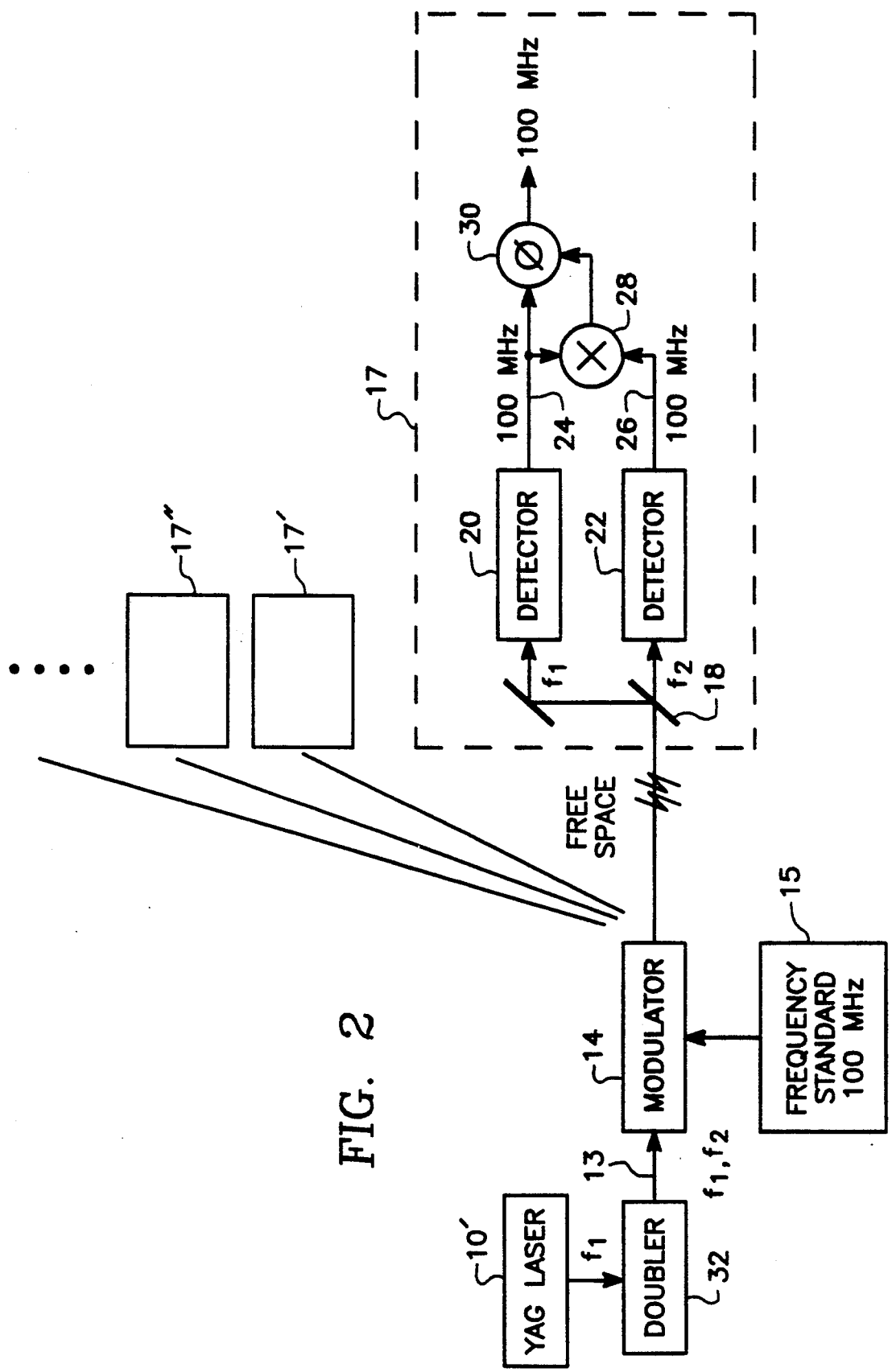
FIG. 2 is a block diagram illustrating an embodiment of the invention employing a single laser.

The embodiment of FIG. 2 is similar to that of FIG. 1, with the exception of the use of a single YAG laser 10' with a doubling crystal 32 to generate the dual wavelength carrier 13, and transmission through free space to plural receivers 17', 17". Such a laser system is readily available from commercial vendors. Such diode pump systems typically have an overall efficiency of 70%. The complete laser and doubler system is packaged in a box less than 3 inches in each dimension.

One of the significant features of the proposed research is that it provides an approach to distribute stable references in free space by pointing the laser transmitter located at one station in a complex to the receiver at the remote location within the same complex. It may also be employed to transfer reference frequencies to satellites. Finally, it will provide an effective approach for calibrating the fluctuations of the atmosphere by dual frequency lasers and stable reference signals. This capability is crucially significant to all radio science experiments where delay due to fluctuations of the atmosphere represents the limitation of the experimental sensitivity.

Analysis

The present invention can overcome delay instabilities produced when an optical carrier modulated by a stable reference propagates in a dispersive medium. The basis lies in the difference in group velocities when two light signals at two (different) wavelengths propagate in a medium.

This phenomenon has been explored previously, as early as 1965 by Bender, et al. (P. L. Bendera and J. C. Owens, *J. Geophys. Res.*, 70, 2461 (1965)) to make precise measurements of distance, or precise determination of the index of refraction of the atmosphere. The previous approaches however relied on a knowledge of the different group indices for the two wavelengths as well as a round trip geometry to measure distances accurately through fluctuating atmospheres. The approach was thus ill suited for the frequency distribution.

Other applications of the effect of differences in group velocities have been utilized in the microwave regime to overcome the atmospheric propagation effects through dual frequency uplink and/or downlink at S and X band, as well as in the Global Positioning Satellite (GPS) system. Here again the required instrumentation is somewhat complex, and places burdens on the spacecraft mass and power, as well as cost.

The major advantage of the dual wavelength scheme presented here is in utilizing a single transmitter emitting light at two different frequencies as a simple means to transfer reference signals as modulations on the dual carrier.

Consider a beam of light consisting of two wavelengths $\lambda_1$ and $\lambda_2$. Assume that the beam is modulated by a reference derived from a frequency standard at some frequency f. The modulated beam then traverses a distance L in a dispersive medium. The medium has a (phase) index of refraction $n_1$ and $n_2$ corresponding to wavelengths $\lambda_1$ and $\lambda_2$. Now, in a medium with index n, the group velocity $v_g$ is given by, $$v_g = d\omega/dk,$$

where $\omega$ is $2\pi c/\lambda$, and c is velocity of light in vacuum. For a modulation carried by the beam in the medium, the group index n is equal to $c/v_g$. The above relations are easily combined to get, $$v_g = c/\{n - \lambda(dn/d\lambda)\}.$$

The time T taken for a signal to travel the distance L is, $$t = L/v_g,$$

so that:

$$t = (L/c)\{n - \lambda(dn/d\lambda)\}. \tag{1}$$

Now the difference $\delta t$ between the times of travel $t_1$ and $t_2$ for wavelengths $\lambda_1$ and $\lambda_2$ is given, according to equation (1) above, by:

$$\delta t = (L/c)\{(n_1 - n_2) - \Xi\lambda_1(dn_1/d\lambda_1) - \lambda_2(dn_2/d\lambda_2)\}. \tag{2}$$

The magnitude of $\delta t$ in equation 2 above naturally depends on the dispersive properties of the particular medium, but can be appreciable for typical applications. To illustrate this, consider a system consisting of fused silica fiber for the reference frequency transmission. Assume that the frequency of the reference is 100 MHz, and that laser wavelengths of 850 nm and 1300 nm are used for the dual reference frequencies in fiber optic applications. For such a system $\delta t$ is of the order of $2 \times 10^{-11}$ seconds per meter. For L equal to one kilometer, $\delta t$ is 20 ns, corresponding to a phase difference of 720 degrees. Since the measurement of phase to a level of $10^{-4}$ degrees is practical, a variation of 7 parts per million may be measured over this distance. Note that the sensitivity of the measurement increases with distance and with the frequency of the transmitted reference signal. For reference transmissions at 1 GHz, another factor of 10 will be obtained in the invention.

Similar results are also obtained for the case of free space propagation. If we assume the use of a Nd:YAG laser at fundamental and second harmonic frequencies (as currently planned for optical communication links in free space), and use values of index of refraction of air in the literature, we obtain a value for $\delta t$ of the order of $1.5 \times 10^{-14}$ per meter. Assuming an effective atmosphere of 10 km and a modulation frequency of 2 GHz, the corresponding delay difference in the signal from the two carriers is 3 ns.

The analysis above suggests that this scheme may be regarded as transmitting a reference frequency and a fixed phase; the latter may be used at the receiver end to correct for variations due to delay changes. It is important to note that the phase information pertains to the integrated effects resulting in the delay, irrespective of the physical details or the speed of the variations that produced the delay.

While the invention has been described with specific reference to embodiments employing optical carrier frequencies, other carrier frequencies may also be employed.

While the invention has been described in detail by reference to preferred embodiments thereof, it is understood that variations and modifications thereof may be made without departing from the true spirit and scope of the invention.

What is claimed is:

1. A one-way remote communication reference signal transmission system for transmitting a synchronizing reference signal through a dispersive medium having different refractive indices at different frequencies, comprising:
   a transmitter station comprising:
      means for generating a first carrier signal having a first carrier frequency and a second carrier signal having a second carrier frequency;
      means for modulating said first and second carrier signals with a reference signal having a reference frequency whereby to generate first and second modulated carrier signals of said first and second carrier frequencies respectively;
   a receiver station comprising:
      means for receiving said first modulated carrier signal and for detecting in said first modulated carrier signal a first received reference signal having said reference frequency;
      means for receiving said second modulated carrier signal and for detecting in said second modulated carrier signal a second received reference signal having said reference frequency;
      means for sensing a phase difference between said first and second received reference signals, said phase difference being a function of a difference between refractive indices of said medium at said first and second frequencies; and
      means for adjusting the phase of said first received reference signal as a function of said phase difference, whereby to generate a corrected reference signal in said receiver station which is free of dispersive effects caused by said dispersive medium.

2. The system of claim 1 further comprising means for combining said first and second carrier signals into a combined carrier signal representing said first and second carrier signals, whereby said means for modulating modulates said combined carrier signal whereby said first and second modulated carrier signals are represented in a combined modulated carrier signal.

3. The system of claim 2 wherein said means for generating said first and second carrier signals comprises means for generating a pair of laser beams of respective wavelengths comprising said first and second carrier signals.

4. The system of claim 3 wherein said means for combining combines said pair of laser beams into a single laser beam, whereby said means for modulating comprises means for modulating said single laser beam with said reference frequency wherein said combined modulated carrier signal comprises a modulated laser beam.

5. The system of claim 4 further comprising an optical fiber connected between said transmitting and receiving stations, wherein said transmitting station further comprises means for focusing said modulated laser beam on an optical fiber.

6. The system of claim 5 wherein said receiver station comprises:
   means for detecting a received modulated laser beam from said optical fiber; and
   means for separating said received modulated laser beam into first and second modulated laser beams comprising said first and second received modulated carrier signals of said respective wavelengths.

7. The system of claim 1 wherein said means for sensing a phase difference comprises means for mixing said first and second received reference signals whereby to produce a phase control signal having a magnitude proportional to said phase difference.

8. The system of claim 7 wherein said means for adjusting the phase difference comprises delay means for delaying said first received reference signal by an amount of delay proportional to the magnitude of said phase control signal.

9. The system of claim 1 wherein said transmitting station comprises means for transmitting said first and second modulated carrier signals to said receiving station through free space.

10. The system of claim 1 further comprising a plurality of receiving stations receiving said modulated carrier signals.

11. The system of claim 3 wherein said means for generating a pair of laser beams of respective wavelengths comprise a single laser and a frequency double connected to said single laser.

12. The system of claim 2 wherein said receiver station further comprises means for receiving said combined modulated carrier signal and for separating therefrom said first and second modulated carrier signals.

13. A one-way remote communication reference signal transmission method for transmitting a reference through a dispersive medium having different refractive indices at different frequencies, comprising:
   at a transmitter station;
      generating a first carrier signal having a first carrier frequency and a second carrier signal having a second carrier frequency;
      modulating said first and second carrier signals with a reference signal having a reference frequency whereby to generate first and second modulated carrier signals;
   at a receiver station;
      receiving said first modulated carrier signal and detecting a first received reference signal having said reference frequency in said first modulated carrier signal;
      receiving said second modulated carrier signal and detecting a second received reference signal having said reference frequency in said second modulated carrier signal;
      sensing a phase difference between said first and second received reference signals, said phase difference being a function of a difference between the refractive indices of said medium at said first and second frequencies; and
      adjusting the phase of said first received reference signal as a function of said phase difference, whereby to generate a corrected reference signal in said receiver station which is free of dispersive effects caused by said dispersive medium.

14. The method of claim 13 further comprising combining said first and second carrier signals into a single carrier signal representing said first and second carrier signals, whereby said step of modulating modulates said combined carrier signal whereby said first and second modulated carrier signals are represented in a combined modulated carrier signal.

15. The method of claim 14 wherein said step of generating said first and second carrier signals comprises generating a pair of laser beams of respective wavelengths comprising said first and second carrier signals.

16. The method of claim 15 wherein said step of combining combines said pair of laser beams into a single laser beam, whereby said step of modulating comprises modulating said single laser beam with said reference frequency wherein said combined modulated carrier signal comprises a modulated laser beam.

17. The method of claim 16 wherein an optical fiber is connected between said transmitting and receiving stations, said method further comprising focusing said modulated laser beam at said transmitting station on an optical fiber.

18. The method of claim 17 further comprising at said receiving station:
   detecting a received modulated laser beam from said optical fiber; and
   separating said received modulated laser beam into first and second modulated laser beams comprising said first and second received modulated carrier signals of said respective wavelengths.

19. The method of claim 13 wherein said step of sensing a phase difference comprises mixing said first and second received reference signals whereby to produce a phase control signal having a magnitude proportional to said phase difference.

20. The method of claim 19 wherein said step of adjusting the phase difference comprises delaying said first received reference signal by an amount of delay proportional to the magnitude of said phase control signal.

21. The method of claim 13 further comprising at said transmitting station transmitting said first and second modulated carrier signals to said receiving station through free space.

22. The method of claim 14 further comprising as said receiving station receiving said combined modulated carrier signal and separating therefrom said first and second modulated carrier signals.

23. A one-way remote communication reference receiver system in which a receiver is synchronized with a received reference standard which has been received through a dispersive medium having different refractive indices at different frequencies, said reference standard comprising first and second modulated carrier signals comprising a first carrier signal having a first carrier frequency modulated by a reference signal having a reference frequency and a second carrier signal having a second carrier frequency modulated by said reference signal, said reference receiver system comprising:
   means for receiving said first modulated carrier signal and detecting in said first modulated carrier signal a first received reference signal having said reference frequency, and for receiving said second modulated carrier signal and detecting in said second modulated carrier signal a second received reference signal having said reference frequency;
   means for sensing a phase difference between said first and second received reference signals corresponding to different refractive indices of said medium at said first and second frequencies; and
   means for adjusting the phase of said first received reference signal as a function of said phase difference, whereby to generate a corrected reference signal in said receiver which is free of dispersive effects caused by said dispersive medium.

24. The system of claim 23 further comprising:
   means for detecting a received modulated laser beam; and
   means for separating said received modulated laser beam into first and second modulated laser beams comprising said first and second received modulated carrier signals of said respective wavelengths.

25. The system of claim 23 wherein said means for sensing a phase difference comprises means for mixing said first and second received reference signals whereby to produce a phase control signal having a magnitude proportional to said phase difference.

26. The system of claim 25 wherein said means for adjusting the phase difference comprises delay means for delaying said first received reference signal by an amount of delay proportional to the magnitude of said phase control signal.

27. The system of claim 23 further comprising means for receiving said reference standard and for separating therefrom said first and second modulated carrier signals.

28. In a one-way remote communication receiver, a method for synchronizing said receiver with a received reference standard which has been received through a dispersive medium having different refractive indices at different frequencies, said reference standard comprising first and second modulated carrier signals comprising a first carrier signal having a first carrier frequency modulated by a reference signal having a reference frequency and a second carrier signal having a second carrier frequency modulated by said reference signal, said method comprising:
   receiving said first modulated carrier signal and detecting in said first modulated carrier signal a first received reference signal having said reference frequency;
   receiving said second modulated carrier signal and detecting in said second modulated carrier signal a second received reference signal having said reference frequency;
   sensing a phase difference between said first and second received reference signals, said phase difference corresponding to a difference in the refractive indices of said medium at said first and second frequencies; and
   adjusting the phase of said first received reference signal as a function of said phase difference, whereby to generate a corrected reference signal in said receiver which is free of dispersive effects caused by said dispersive medium.

29. The method of claim 28 further comprising:
   detecting a received modulated laser beam; and
   separating said received modulated laser beam into first and second modulated laser beams comprising said first and second received modulated carrier signals of said respective wavelengths.

30. The method of claim 28 wherein said step of sensing a phase difference comprises mixing said first and second received reference signals whereby to produce a phase control signal having a magnitude proportional to said phase difference.

31. The method of claim 30 wherein said step of adjusting the phase difference comprises delaying said first received reference signal by an amount of delay proportional to the magnitude of said phase control signal.

32. The method of claim 28 further comprising receiving said reference standard and separating therefrom said first and second modulated carrier signals.

* * * * *